US005783622A

United States Patent [19]

Sabata et al.

[11] Patent Number: 5,783,622

[45] Date of Patent: Jul. 21, 1998

[54] PRECOATED CHROMIUM ALLOYED STEEL WITH ENHANCED PAINT ADHESION FOR EXHAUST APPLICATIONS

[75] Inventors: Ashok Sabata, Middletown; Joseph A. Douthett, Monroe; Sherman E. Winkle, Sr., Franklin, all of Ohio

[73] Assignee: Armco Inc., Middletown, Ohio

[21] Appl. No.: 851,259

[22] Filed: May 5, 1997

[51] Int. Cl.$^{6}$ .................................................. C08K 3/34

[52] U.S. Cl. ......................... 524/444; 428/623; 524/140; 524/276

[58] Field of Search .................................... 524/276, 140, 524/444; 428/623

[56] References Cited

U.S. PATENT DOCUMENTS

| | | | |
|---|---|---|---|
| 4,702,968 | 10/1987 | Masuhara et al. | 428/623 |
| 4,942,193 | 7/1990 | Van Buskirk et al. | 524/276 |
| 5,021,489 | 6/1991 | Knight et al. | 524/140 |
| 5,438,083 | 8/1995 | Takimoto et al. . | |

FOREIGN PATENT DOCUMENTS

| | | |
|---|---|---|
| 81468 | 4/1986 | Japan . |
| 99679 | 5/1986 | Japan . |
| 258871 | 11/1986 | Japan . |
| 21314 | 1/1988 | Japan . |
| 53723 | 2/1995 | Japan . |

OTHER PUBLICATIONS

William A. Finzel, "Silicone Coatings", Aug. 1995, Journal of Protectice Coatings & Linings.

*Primary Examiner*—Terressa Mosley

*Attorney, Agent, or Firm*—R. J. Bunyard; L. A. Fillnow

[57] ABSTRACT

A stainless steel sheet suitable for use in the manufacture of an exhaust component. The steel sheet has at least one surface pretreated with a protective coating resistant to delamination at temperatures up to about 540° C. including an inner inorganic portion and an outer organic portion. The inorganic portion includes at least 50 mg/m$^2$ of a chromium based conversion coating having a thickness no greater then 0.02 mm. The conversion coating contains particulate silica with the weight ratio of chromium to silica within the range of 1:1 to 2:1. The outer organic portion includes a silicone paint containing 40–60 wt. % silicone resin. The silicone paint is dried at a temperature less than 300° C. in less than one minute and then coated with a copolymer of a thermoplastic acrylic and a lubricant or a polymeric olefin. The acrylic copolymer contains 5–70 wt. % of the lubricant and the polymeric olefin contains 90% olefin resin. The lubricant coated steel sheet then is dried at a temperature of a 25°–120° C. for less than one minute to form a film thickness of 0.0005–0.020 mm, having a coefficient of friction of no greater than about 0.05 and a weight of 10–5000 mg/m$^2$. The dried silicone paint covered by the dry lubricant film is tack-free, impervious to moisture, oil, dirt, and the like with the silicone coated steel sheet ready for forming into an exhaust component with minimal delamination of the dried silicone paint without additional external lubricant being required on the sheet.

20 Claims, No Drawings

PRECOATED CHROMIUM ALLOYED STEEL WITH ENHANCED PAINT ADHESION FOR EXHAUST APPLICATIONS

BACKGROUND OF THE INVENTION

This invention relates to a steel sheet suitable for use in the manufacture of heat resistant parts such as used for an exhaust component. The sheet is pretreated with a protective coating having an inner inorganic portion and an outer organic portion with the organic portion covered by a dry lubricant film. The inorganic portion is formed from a dried-in-place chromic acid based conversion coating containing a particulate material and the organic portion includes a dried silicone paint covered with a tack-free, moisture resistant film of a thermoplastic acrylic and a lubricant or a polymeric olefin. The pretreated sheet is capable of being formed into a part and welded without additional external lubricant being required on the unformed steel sheet.

Unlike on cold-rolled steel, it is very difficult to obtain good paint adhesion on chromium alloyed steels such as stainless steel. An apparent reason for poor paint wettability to a stainless steel surface is because the surface of these steels is covered with a passive oxide. Many different types of acid etchants have been used to remove this passive oxide to enhance paint adhesion. This approach, however, has not resulted in good paint adhesion on stainless steel, especially those fabricated into parts exposed to high temperature and wet corrosion environments.

Other artisans have proposed one or two step rinsing techniques for stainless steels using an acid bath containing hexavalent chromium and a silane coupling agent prior to painting. For example, after being immersed into chromic acid, the etched steel may be rinsed with an aqueous solution containing the silane coupling agent. Alternatively, the chromic acid may include a dispersion of a silicate and the silane. Although good adhesion may be obtained, a major disadvantage of these processes using chromic acids relates to environmental costs associated with disposal of waste solutions containing hazardous hexavalent chromium.

Various temperature resistant organic resin based paints are coated onto steel surfaces subjected to cyclic heat in a corrosive atmosphere. These heated surfaces include boilers, stacks, space heaters, stoves, engine manifolds, mufflers, and the like. Multi-functional organic resins that cure through chemical reaction can exhibit high levels of heat resistance because if they include enhanced cross-link density. Cured resins such as epoxy, phenolics and novolacs have moderate heat resistance up to about 260° C.

Because of a high degree of cross-linking with multi-functional silane groups, organo functional siloxane based resins, i.e., silicone, have excellent thermal stability and strong resistance to oxidation. Accordingly, silicone is known to be one of the most heat resistant resins for elevated temperature service and is widely used as a binder and modified with other organic resins for forming a paint system. A typical high temperature paint formulation would include a silicone resin, one or more pigments for color, a hydrocarbon solvent, an extender for bulk, e.g., mica, magnesium silicate, aluminum silicate and a catalyst to help cross-linking, e.g., iron octonate, zinc naphthenate. A silicone-modified organic resin system including 15–50% silicone can have heat resistance up to about 204° C. An organic modified-silicone resin system including 51–90% silicone can have heat resistance can be increased up to about 370° C. An organic modified-silicone resin system including 51–90% silicone and black pigment can have heat resistance up to about 427° C. These are general guidelines. With appropriate modifications, an organically modified resin can have heat resistance higher than 427° C. A resin system containing 100% silicone and a black pigment can have heat resistance increased to about 538° C. A resin system containing 100% silicone and a ceramic pigment can have heat resistance increased to about 760° C.

It is known to apply temperature resistant organic resin based paints, especially those containing black pigments, to steel exhaust components for internal combustion engines. These paints are commercially available under various designations such as Muffler Paint, High Heat Coatings, High Temperature Resistant Paint and Exhaust System Coatings. High temperature resistant paints for this purpose can be produced from a silicone-modified organic resin or an organic modified-silicone resin. For example, U.S. Pat. No. 5,021,489 relates to a corrosion inhibiting steel coating mixture containing 10–35 parts of a silicone resin, 2–35 parts of a silicone-alkyd copolymer resin, 10–35 parts of an acrylic resin, 0.5–5 parts of an organic phosphate, 1.0–10 parts of a metal sulphonate, 5–40 parts of a low molecular weight aliphatic alcohol and 10–50 parts of an organic solvent.

U.S. Pat. No. 4,702,968 relates to an aluminized steel sequentially pretreated with a chromate solution, a primer coating of a polyamide imide resin containing strontium chromate and a black top coat of a silicone modified polyester. The chromate layer has a chromium pickup of 10–50 mg/m$^2$, the primer coat has a thickness of 3–8 microns and the top coat has a thickness of 8–20 microns. The polyester layer contains 30–50% modification by a polysiloxane oligomer having 3–12 silicon atoms and 2–4 terminal groups selected from —SiOH and —SiOR' where R' is methyl.

Japanese patent application 61-081468 relates to a heat resistant coating for stainless steel exhaust mufflers containing a silicone resin paint. The paint includes 78–93 wt. % silicone resin, 3–8 wt. % butyl titanium, 1–5 wt. % talc and 3–8 wt. % synthetic mica. The paint is dried and then baked at temperatures above 1000° C.

Japanese patent application 7-053723 relates to a heat resistant coating for exhaust mufflers containing a polyester modified silicone resin. The silicone resin is modified by mixing polyester resin having at least two OH groups and terminal reactive dimethylpolysiloxane, hydrolyzing and polycondensing the mixture in the presence of a catalyst.

Japanese patent application 63-021314 relates to preventing long term corrosion of a muffler. A muffler produced from a metallic coated steel is pretreated with chromate solution and then coated with an organic modified silicone resin. Heating of the muffler decomposes the organic portion of the silicone resin leaving a corrosion protecting silicone resin film.

When these organic paint compositions are cured on a steel sheet to make prepainted steel, the cured coating becomes very brittle having limited ductility and tends to peel or delaminate during forming/stamping of the sheet to make an exhaust component. This is due to inadequate adhesion of the paint to the formed part. In addition, there is buildup of the peeled paint on the forming dies. Because of this poor adherence, the steel sheet generally can not be painted with a cured organic silicone paint prior to forming/stamping.

Applying a silicone paint to a steel sheet prior to fabrication into an exhaust component without curing of the paint was not a practical solution to this problem either because uncured silicone paint is very tacky. When an uncured painted steel sheet was wound into a coil, the laps tended to stick together when attempting to unwind the coil for fabrication of the exhaust component.

Accordingly, at the present time, exhaust components are spray painted after the components are fabricated. The painting of exhaust components is done primarily for a cosmetic reason, i.e., appearance. The paint transfer efficiency for these spraying operations is generally 40–70% resulting in wasted paint, requiring paint clean up and a disposal problem. In addition, when the exhaust component is a vehicle muffler, this paint often times delaminates from the muffler in less than one year.

As evidenced by the attempts of previous workers, there has been a long felt need to develop a heat resistant steel, especially made from chromium alloyed steel to be formed into an exhaust component, pretreated with a paint having high temperature and wet corrosion resistance and improved adherence to the steel surface. There also has been a need especially for such a painted chromium alloyed steel sheet having improved adherence when forming the steel sheet into the exhaust component. The process for producing such a painted chromium alloyed steel sheet should be low cost and use only those coating materials non-toxic to the environment so that they can be disposed of safely.

BRIEF SUMMARY OF THE INVENTION

This invention relates to a steel sheet, such as a chromium alloyed steel, pretreated on at least one surface with a protective coating resistant to delamination at temperatures up to about 540° C. The protective coating includes an inner inorganic portion, an outer organic portion with the organic portion including a top dry polymeric lubricating film. The inorganic portion includes a chromium based conversion coating containing a particulate material. The organic portion comprises a dried organic paint containing at least 20 wt. % silicone. The dry lubricating film covers the silicone coated surface and is a copolymer of a thermoplastic acrylic and a lubricant with the copolymer containing 5–70 wt. % of the lubricant or at least 90% polymeric olefin. The coated steel sheet is dry, tack-free, impervious to moisture, oil, dirt, and the like and ready to be formed and capable of being welded into a heat resistant steel part with minimal delamination of the dried silicone coating without additional external lubricant being required on the sheet. The silicone paint is cured during service of the heat resistant part.

Another feature of the invention includes the aforesaid silicone paint being formed from an organically modified resin and including one or more of a catalyst, a pigment, an extender and an inhibitor.

Another feature of the invention includes the aforesaid dried silicone coating having a thickness of 0.005–0.05 mm.

Another feature of the invention includes the aforesaid dry film having a thickness of ≦0.02 mm.

Another feature of the invention includes the aforesaid dry film having a coating weight of 10–5000 mg/m$^2$.

Another feature of the invention includes the aforesaid dry film having a coefficient of friction of no greater than about 0.05.

Another feature of the invention includes the aforesaid conversion coating having a weight ratio of chromium to the particulate within the range of 1:1 to 2:1.

Another feature of the invention includes the aforesaid conversion coating having a weight of at least 50 mg/m$^2$.

Another feature of the invention includes the aforesaid conversion coating having a weight of 100–500 mg/m$^2$ and having a thickness of ≦0.02 mm.

Another feature of the invention includes the aforesaid particles having a size of 0.001–0.2μ and being from the group consisting of silica and titanium oxide.

Another feature of the invention includes the aforesaid sheet being chromium alloyed steel.

The invention also includes a process for the production of a steel sheet suitable for use in the manufacture of a heat resistant part. The process includes coating at least one surface of the steel sheet with a chromic acid based liquid containing particulate material. The sheet is dried to form a conversion coating on the one surface. The conversion coated surface then is coated with a silicone paint containing at least 50 wt. % solids with the solids portion of the paint being at least 20 wt. % silicone resin. The silicone coated sheet is heated to an elevated temperature for sufficient time to dry the silicone coating. The dried silicone coated surface then is coated with an aqueous suspension containing 10–60% solids of a polymeric lubricant. The polymeric lubricant may be a copolymer of a thermoplastic acrylic and a lubricant or a polymeric olefin. The acrylic copolymer contains 5–70 wt. % of the lubricant. The polymeric olefin contains 90% of olefin. The polymeric lubricant coated surface is heated to an elevated temperature for sufficient time to form a dry, tack-free film impervious to moisture, oil, dirt, and the like and ready for being formed and capable of being welded into a heat resistant steel part with minimal delamination of the dried silicone coating without additional lubricant being applied to the one surface. The silicone paint is cured during service of the heat resistant part.

Another feature of the invention includes the aforesaid silicone coated sheet being dried at a peak metal temperature less than 300° C.

Another feature of the invention includes the aforesaid silicone coated sheet being dried at a peak metal temperature less than 250° C. in less than 1 minute.

Another feature of the invention includes the aforesaid conversion coating having a weight ratio of chromium to silica within the range of 1:1 to 2:1.

Another feature of the invention includes the aforesaid conversion coating having a weight of at least 50 mg/m$^2$ on the one surface.

Another feature of the invention includes the aforesaid conversion coating containing no greater than 15 wt. % hexavalent chromium.

Another feature of the invention includes the aforesaid lubricant coated sheet being heated to a peak metal temperature of 25°–120° C. to cure the polymeric lubricant.

A principal object of the invention is to provide a prepainted flat steel sheet able to be formed into a heat resistant component without delamination or loss of adhesion of the paint and having good corrosion resistance.

Another object of the invention is to provide a prepainted chromium alloyed steel exhaust component having superior high temperature and wet corrosion resistance.

Another object of the invention is to provide a prepainted chromium alloyed steel exhaust component that resists degradation of the paint at temperatures up to 540° C.

Another object of the invention is to provide a prepainted chromium alloyed flat steel sheet capable of being formed into an exhaust component without causing paint buildup on the forming dies.

Another object of the invention is to provide a prepainted steel sheet without using coating materials or creating waste by-products of coating materials that are toxic to the environment.

Another object of the invention is to provide a prepainted steel sheet that is impervious to moisture, oil, dirt, and the like and capable of being welded after being formed into a heat resistant component.

An important advantage of this invention is being able to coat a dried paint that is not fully cross-linked onto a steel sheet with the laps of the sheet not sticking to one another when the sheet is wound into a coil. An equally important advantage of this invention is being able to form a heat resistant part from a flat steel sheet coated with a soft but non-sticky dried paint. Another advantage of this invention is being able to weld a part formed from a steel sheet coated with a dried paint that is not fully cross-linked without fuming of the uncured paint. Another advantage of the invention includes providing excellent paint adhesion on chromium alloyed steels without using or creating environmentally hazardous substances that cause disposal problems. Other advantages include obviating the need for costly additional lubricant to a flat steel sheet prior to fabrication into an exhaust component that causes safety problems in the work place, low production cost and a painted chromium alloyed steel sheet having high durability and water resistance. Still other advantages include a high transfer efficiency, i.e., at least 95%, of paint during sheet painting, minimal clean up cost and a process that is not labor intensive.

DETAILED DESCRIPTION OF THE PREFERRED EMBODIMENTS

This invention relates to a heat resistant steel sheet, and a process therefore, precoated with an inorganic/organic protective coating. The protective coating is dry, tack-free, impervious to moisture, oil, dirt, and the like. The coated sheet is ready for being formed with minimal delamination of the protective coating and capable of being welded thereafter without fuming of the protective coating. Additional lubricant does not have to be applied to the sheet prior to forming.

By heat resistant steel sheet, it will be understood to mean a steel sheet capable of being formed into parts exposed to elevated service temperatures, especially cyclic service temperatures including a corrosive atmosphere, up to about 540° C. Non-limiting exemplary applications include engine manifolds, engine mufflers, catalytic converters, boilers, ovens, furnaces, stacks, space heaters, stoves, incinerators and outdoor grills.

By steel sheet of the invention is meant hot rolled and pickled steel, cold-rolled steel, cold-rolled chromium alloyed steel, cold-rolled stainless steel and metallic coated steels. By metallic coated is meant the steel sheet is hot dip coated, electroplated, diffusion coated and the like with a non-ferrous metal such as aluminum, aluminum alloy, zinc, zinc alloy, lead, lead alloy, terne metal, nickel, nickel alloy and the like. By chromium alloyed steel is meant to include those steels alloyed with at least 5 wt. % chromium, and stainless steel alloyed with at least 10 wt. % chromium, such the 300 and 400 hundred series types. Painted T409 stainless steel, painted hot dipped aluminized T409 stainless steel and painted hot dipped aluminized carbon steel have particular utility for internal combustion exhaust components for automotive vehicles such as manifolds, engine mufflers and catalytic converters. By sheet is meant to include continuous strip or foil and cut lengths.

This invention preferably includes a chromium alloyed steel sheet coated on at least one surface with a protective coating resistant to delamination or peeling at temperatures up to about 540° C. having an inner inorganic portion, an outer organic portion with the organic portion including a top dry film. The inner inorganic portion includes at least 50 mg/m$^2$ on the one surface of a dried-in-place hexavalent chromic acid based conversion coating containing a particulate material and having a weight ratio of chromium to the particulate material within the range of 1:1 to 2:1. The particulate material is a very important feature of this invention because the particles give high temperature stability to the conversion coating thereby allowing the paint to remain tightly bonded to the exhaust component even at very high operating temperatures up to about 540° C. The outer organic portion includes a dried silicone paint containing at least 20 wt. %, preferably at least 30 wt. %, more preferably at least 40 wt. % and most preferably 40–60 wt. %, silicone resin. The organic portion has a thickness of at least 0.005 mm on the one surface. The dry lubricant film is formed from an aqueous suspension containing 10–60% solids of a polymeric lubricant. The polymeric lubricant may be a copolymer of a thermoplastic acrylic and a lubricant or a polymeric olefin. If the lubricant film is an acrylic copolymer, it will contain 5–70 wt. % of the lubricant. If the lubricant film is polymeric olefin, olefin resin will comprise at least 90% of the film. The coating weight of the lubricant film on the one surface should be least 10 mg/m$^2$.

The protective coating may be formed on at least one surface of the chromium alloyed steel sheet with a hexavalent chromic acid based colloidal suspension containing a particulate material and having a weight ratio of chromium to the particulate material within the range of 1:1 to 2:1. The entire one surface is uniformly coated so that the weight of the conversion coating after drying the sheet is at least 50 mg/m$^2$. Preferably, the conversion coating has a thickness no greater than about 0.01 mm and a coating weight of at least 100 mg/m$^2$ and more preferably about 150–250 mg/m$^2$. The conversion coating weight should not exceed about 500 mg/m$^2$ and have a thickness no greater than about 0.02 mm because failure upon forming/stamping of the steel sheet will occur in the underlying chromate layer. After drying, the inorganic conversion coated surface is coated with a silicone paint. The sheet is heated at an elevated temperature for sufficient time to dry the silicone paint. The organic silicone coated surface then is coated with a continuous coating from an aqueous suspension containing 10–60% solids of a polymeric lubricant. The polymeric lubricant may be a copolymer of a thermoplastic acrylic and a lubricant or a polymeric olefin. An acrylic copolymer contains 5–70 wt. % of the lubricant. A polymeric olefin contains at least 90% of olefin resin. The sheet is heated at an elevated temperature for sufficient time to form a dry, tack-free top lubricant film on the organic silicone paint.

The colloidal suspension includes dissolved hexavalent ($Cr^{+6}$) and trivalent chromium ($Cr^{+3}$) utilizing a particulate material having high temperature stability compound to promote formation and adhesion of the silicone coating to the surface of the steel sheet. The chromic acid based coating of the invention is a dry-in-place type conversion coating. This dry-in-place type conversion coating is an important feature of this invention. Unlike the prior art using chromic acid based immersion solutions, a dry-in-place type coating does not form a toxic waste by-product. Another reason for using a dry-in-place type conversion coating is because it insures oxidation and conversion of the steel sheet surface to a chromate. It also is very important to obtain complete and uniform coverage of the entire surface of the sheet with sufficient thickness of the chromate layer to insure good adhesion of the outer organic protective layer to the surface of the steel sheet.

Another important aspect of the invention is for the conversion coating to include a particulate material having not only high temperature stability thereby allowing the paint to remain tightly bonded to the exhaust component even at very high operating temperatures up to about 540° C. but also a small size less than about 0.2 micron (μ). The particulate material acts as a carrier for ionic hexavalent chromium so that the chromium remains well distributed within the colloidal suspension. The chromium ions are suspended by being adsorbed/absorbed onto the surfaces of the small particles. A suitable particulate material meeting these requirements is fumed silica. Fumed silica has a size of about 0.001–0.2μ. Particles having a size larger than about 0.2μ are undesirable because they will not form a colloid and tend to precipitate. Conversely, particles having a size much smaller than 0.001μ are undesirable because they essentially are ionic and tend to become dissolved into the suspension. Suitable particulate materials include silica ($SiO_x$) and titanium oxide ($TiO_x$), with silica being preferred.

The organic portion of the protective coating of this invention is formed from a water based or solvent based paint containing an organic silicone resin for forming a dry protective coating having thermal stability up to about 540° C. The liquid paint contains at least 50 wt. % solids with the solids portion of the paint, i.e., dried paint, being at least 20 wt. % silicone resin. Preferably, the solids portion of the paint is at least 30 wt. % silicone resin, more preferably at least 40 wt. % silicone resin and most preferably 40–60 wt. % silicone resin. The volatile organic content (V.O.C.) of the silicone paint preferably is no greater than 0.42 kg/l. By the expression "silicone resin" is meant silicone resins having a backbone structure $(Si—O—Si—)_n$ formed from an organopolysiloxane oligomer having 3–12 silicon atoms and 2–4 terminal groups selected from —SiOH and —SiOR', wherein the organic end groups R' represent a lower alkyl having 1–4 carbon atoms, such as phenyl, methyl, methylphenyl, diphenyl, and the like. A phenyl organic group is desirable because it provides good high temperature and oxidation resistance as well as good self life to silicone resin. A methyl organic group is desirable because it provides good hot hardness, flexibility, good chemical resistance and good thermal shock resistance. Non-limiting examples of silicone resin, i.e., siloxane, include di-methy siloxane, polymethy siloxane and polymethy-phenyl siloxane. The expression "silicone resin" also is meant to include a silicone resin organically modified by being reacted with another resin. Organic resins suitable for modifying the silicone resin include alkyds, phenolics, epoxies, epoxy esters, urethanes, acrylics and polyesters. Modified silicones of the invention would have a molecular weight between about 5000–20000 and may include other end groups such as methy-phenyl, diphenyl, hydroxyl on the backbone. These end groups aid in crosslinking of the paint. Modified silicones help to lower the drying temperature necessary to avoid tackiness to the surface of a steel sheet coated with the silicone paint. Cross-linking of the paint would occur during service of the formed heat resistant part. A modified silicone resin also improves the adhesion of the paint to the steel sheet during forming/stamping of the sheet into a heat resistant part without cross-linking.

Preferably, the silicone resin will be dissolved in a liquid solvent carrier such as xylene or toluene for forming a paint. This paint may contain one or more of a catalyst, a pigment, an extender and an inhibitor. A suitable catalyst is iron octonate. Suitable inorganic pigments for coloring the paint include metallic fillers, spinels of iron oxide, magnesium oxide, carbon black, graphite, silica, siliceous muscovite, aluminum, aluminum silicate, magnesium silicate and the like. Suitable extenders include mica and nepheline syenite. Suitable inhibitors include zinc phosphate and chromate. Suitable silicone resins for the purpose of this invention are available from Dow Corning Corporation of Midland, Mich. 48686. This organic silicone paint is applied to a chromate conversion coated steel sheet with the dried silicone coating having a thickness of at least 0.005 mm, preferably at least 0.01 mm and more preferably 0.02–0.03 mm. The silicone coating thickness should not exceed about 0.05 mm because the coating may delaminate when the steel sheet is formed into a part. Also, drying of the silicone coating would take more than one minute requiring multiple drying passes in a continuous coating steel sheet operation.

High temperature silicone paints are cured at temperatures of at least about 235° C. in about 30 minutes. A silicone modified paint can be cured at temperatures of about 200° C. in about 20 minutes. Curing of these paints when coated onto a flat steel sheet causes the paint to become very brittle. Forming a steel sheet coated with a cured paint causes the cured paint to peel or delaminate. The discovery of this invention is that a flat steel sheet can be coated with a substantially uncured silicone paint and be non-tacky when the uncured paint is covered by a dry lubricant film. One important advantage of using the dry lubricant film is that a steel sheet continuously coated with a dried but uncured silicone paint can be wound into a coil without the painted coil laps sticking to one another when unwinding the coil during fabrication. That is, the dry lubricant film covers the dried paint that otherwise would be tacky and would have caused the coil laps to otherwise stick together. Another important advantage of using the dry lubricant film is that a steel sheet can be continuously coated with a high temperature resistant dried paint and be formed into a part without delamination or loss of adhesion of the paint. By drying the as-silicone coated steel sheet in less than one minute at a peak metal temperature less than 300° C., preferably less than 250° C., more preferably less than 220° C., minimal curing of the paint occurs so that the paint remains sufficiently soft and ductile for forming without delamination. The dry film provides sufficient lubricity with the paint remaining tightly adherent onto the surface of the steel sheet when being formed into a heat resistant part. By "drying" the silicone paint, it will be understood minimal cross-linking of the paint occurs prior to forming of the heat resistant steel part. The silicone paint on the steel sheet is dried for at least 5 seconds at peak metal temperature. It is preferred that the drying time of the silicone paint at peak metal temperature be at least 20 seconds to prevent welding problems. The welding problems associated with the uncured heat resistant silicone paint of the invention include excessive fuming during welding, e.g., laser welding, of the heat resistant parts formed from the steel sheet and buildup on electrodes used during gas tungsten arc welding. By drying the silicone paint in 20–60 seconds at peak metal temperature, minimal curing of the paint occurs and excessive fuming during welding is avoided. Full curing of the paint on the formed steel parts occurs in-situ during service.

Another important aspect of the invention is for the protective silicone coating to be covered by a dry, tack-free thin polymeric lubricant film. The lubricant film preferably is an acrylate resin including a lubricant such as disclosed in U.S. Pat. No. 4,942,193; incorporated herein by reference. The thin lubricant film is formed from an aqueous suspension containing an acrylic copolymer containing 5–70 wt. %, preferably 10–30 wt. %, of a lubricant based upon the total weight of the copolymer. The acrylic copolymer is a neutralized acid- or base-functional polymer prepared by polymerizing in a solvent medium ethylenically unsaturated monomers. About 10–40 wt. % of the acid-functional polymer can be used in the acrylic copolymer. Examples of acid-functional polymers include acrylic acid, methacrylic acid, crotonic acid, itaconic acid and maleic acid. About 5–20 wt. % of the base-functional polymer can be used in the acrylic copolymer. Examples of base-functional polymers include amino alkyl(meth)acrylate, t-butyl aminoethyl (meth)acrylate and diisobutylaminoethyl(meth)acrylate. The lubricant may include a wax such as polyethylene, petrolatum wax, bees wax, carnauba wax, olefin wax or mixtures thereof. The lubricant may also include one or more additives of silicone fluids, molybdenum disulfide, graphite, hydrocarbon oil or vegetable oil. A thin coating of the aqueous suspension containing the acrylic copolymer and lubricant is applied to the silicone coating and cured in the temperature range of 25°–120° C., preferably 65°–110° C. in less than one minute to form a dry, tack-free lubricant film. It is important that the weight of the dry lubricant film be sufficient so that additional lubricant is not required to be applied to the silicone coating prior to fabrication of the flat steel sheet into an exhaust component. Accordingly, the dry film should be present on the one surface in a weight of at least 10 $mg/m^2$. Preferably, the weight of the dry film is at least 100 $mg/m^2$, more preferably 200–300 $mg/m^2$ and most preferably not greater than 500 $mg/m^2$. The dry film should not about 5000 $mg/m^2$ because it may flake off leaving a residue on the fabricating dies when forming parts from the steel sheet requiring frequent line stoppages and cleanup. The dry film should have a thickness of at least about 0.0005 mm but not exceed about 0.020 mm. Preferably, the dry film should have a thickness at least 0.002 mm, more preferably at least 0.005 mm and most preferably about 0.010 mm.

When the lubricant film is formed from an aqueous suspension containing acrylic resin, the resin must be copolymerized with a lubricant to form the necessary lubricity on the flat steel sheet for forming into a heat resistant part. When the lubricant film is formed from an aqueous suspension containing a polymeric olefin resin, e.g., polyolefin wax, polyolefin powder, it is not necessary to include additional lubricant with the aqueous suspension. A polyolefin film has lubricity similar to that of the acrylic copolymer. By polymeric olefin resin it will be understood that the olefin resin may be polymerized with another resin, e.g., olefin/acrylic acid copolymer. An olefin lubricant film may be formed from a water based or solvent based liquid containing a dispersion of polyolefin wax powder.

Each of the conversion coating, the silicone coating and the lubricant film can be applied to one or both sides of a chromium alloyed steel sheet using conventional coating equipment such as a roll coater, a reverse roll coater, a squeegee roller or an air knife. Preferably, the steel sheet is continuously reverse roll coated. A roll coater is preferred to insure a continuous coating completely covering the entire width of the sheet and to insure the coating is uniform in thickness for the coating/film layers. When the dry lubricant film has sufficient weight/thickness completely covering the steel sheet, e.g., at least 10 $mg/m^2$, applying additional external lubricant to the flat sheet or forming dies immediately prior to forming the exhaust components is not necessary. When at least the minimum coating weight of the dry film is controlled, the coefficient of friction for the steel sheet is about 0.05 or less. On the other hand, lubricant film coating weights greater than about 5000 $mg/m^2$ are undesirable because the lubricant flakes off thereby damaging the underlying paint and creating a buildup on the forming die. The liquid coated sheet may be dried after each of the three coating steps by being passed through convention heating equipment such as a convection furnace or an induction heater.

EXAMPLE 1

One surface of flat cold-rolled annealed pickled 409 stainless steel panels having a thickness of 1 mm, a width of 10 cm and length of 15 cm was alkaline cleaned and given a scotch bright surface treatment. Four of the cleaned panels then were roll coated on the one surface in the laboratory with various thicknesses of a black pigmented silicone paint. After the stainless steel panels were heated to a peak metal temperature of 200° C. and held at this temperature for 35 seconds, the coating thicknesses on the panels were determined to be 0.013 mm, 0.020 mm, 0.028 mm and 0.050 mm. The silicone paint was dry but tacky. These flat panels then were subjected to corrosion tests in accordance to General Motors (GM) specification 9985384. The corrosion tests include heating a sample to 450° C. and then water quenching to 20° C. This procedure is repeated for each of the panels 10 times before exposing the painted panels to a salt fog atmosphere for 168 hours. Thereafter, the appearance of the flat panels was rated visually. The corrosion appearance rating of the panels having 0.013 mm, 0.020 mm, 0.028 mm and 0.050 mm coating thicknesses was 7, 7, 7, 9 respectively. A rating of 9 is defined as a trace of corrosion and 7 is defined as light corrosion and unacceptable. A rating of at least 8 is required to pass the GM test.

EXAMPLE 2

In the following example, two additional ones of the flat cold-rolled annealed pickled 409 stainless steel panels were cleaned and painted as described in Example 1. Prior to painting, however, the cleaned panels this time were pretreated with a dry-in-place chromate conversion coating containing particulate silica prior to being coated with a 0.02 mm thickness of the silicone paint. The panels were coated on the one surface with the chromate conversion coating containing particulate silica. After drying at 100° C., the conversion coating had a thickness of 0.002 mm and a weight of 161 $mg/m^2$. This conversion coating is available from BetzDearborn, Metals Process Group, Morsham, Pa. 19044, sold under the name of Permatreat® 1500. The flat panels were corrosion tested and evaluated as described in Example 1. The corrosion appearance ratings for these panels was improved to 9 and 8. A rating of 8 is defined as slight corrosion. These examples demonstrated that a thinner paint thickness could be used when using the chromate conversion coating and still pass the GM specification rating of at least 8.

EXAMPLE 3

Example 3 is illustrative of the invention. Two additional ones of the flat panels of Example 2 were also roll coated with an aqueous suspension containing an acrylic copolymer lubricant after being chromate conversion pretreated and silicone painted. The aqueous suspension is available from PPG Industries, Allison Park, Pa. sold under the trade name of CHEMFORM TK4. After being dried to a thickness of 0.02 mm, the tacky silicone paint was coated with the acrylic copolymer. The panels then were dried at 110° C. for 35 seconds to form a dry, non-tacky lubricant film having a weight of 2500 $mg/m^2$. The corrosion appearance rating for flat steel panels having an inner inorganic chromate dry-in-place conversion coating and an outer organic protective coating covered with a dry acrylic lubricant film improved to 10 and 9 for these flat panels. A rating of 10 is defined as having no visible corrosion.

EXAMPLE 4

Example 4 further illustrates the invention. Two of the flat panels of Example 2 and two of the flat panels of Example 3 were formed into Swift Cups. The flat panels of Example 3 were coated in accordance with this invention. After the cups were formed, the silicone paint was visually inspected. Those cups formed from flat panels that did not receive the dry lubricant film (Example 2) had cracks in the paint on bends in the cups. These formed cups then were subjected to the GM specification 9985384 corrosion test as described in Example 1. The cups then were subjected to the salt fog atmosphere for 168 hours. Thereafter, the appearance of the formed parts was rated visually. The cups fabricated from the two panels coated according to the procedure of Example 2 failed the corrosion test with a visual rating of only 7. The cups fabricated from the two panels coated according to the procedure of Example 3 easily passed the corrosion test with a visual rating of 9.

The results of Example 4 clearly demonstrated the importance of being able to coat a dried but uncured silicone paint covered by a dry acrylic lubricant film onto a chromium alloyed flat steel sheet and being able to fabricate that flat steel sheet into a formed part with the dried silicone paint remaining tightly adherent to the part during forming. The presence of the dry acrylic lubricant film on the uncured silicone paint allowed the Swift Cups to be formed without delamination or cracking of the uncured silicone paint.

EXAMPLE 5

Example 5 further illustrates the invention. T409 stainless steel flat panels 61 cm by 61 cm were coated as described for Example 3 and thereafter formed into mufflers. After being assembled using laser welding, these mufflers were tested according to General Motors specification 9984299 where the mufflers were heated to 450° C. and then quenched in ice water to 2° C. This was repeated five times. The mufflers then were exposed to salt fog for 168 hr. All the formed mufflers passed this GM test. By drying the silicone coated panels at a peak metal temperature of 200° C. for at least 20 seconds, fuming of the uncured silicone paint did not occur during welding of the mufflers.

It will be understood various modifications can be made to the invention without departing from the spirit and scope of it. Therefore, the limits of the invention should be determined from the appended claims.

What is claimed is:

1. A precoated heat resistant steel sheet, comprising:

a steel sheet, at least one surface of the sheet provided with a protective coating resistant to delamination at temperatures up to about 540° C. including an inner inorganic portion and an outer organic portion with the organic portion including a dry film, the inner inorganic portion including a chromium based conversion coating containing a particulate material, the outer organic portion comprising a silicone paint containing at least 20 wt. % silicone resin, the dry film being a copolymer of thermoplastic acrylic resin and lubricant or polymeric olefin, the copolymer containing 5–70 wt. % of the lubricant and the polymeric olefin containing at least 90% olefin resin whereby the dry film is tack-free, impervious to moisture, oil, dirt, and the like and the coated sheet being ready for forming into a heat resistant part with minimal delamination of the dried silicone paint without additional external lubricant being required on the sheet.

2. The steel sheet of claim 1 wherein the weight of the conversion coating on the one surface is 50–500 $mg/m^2$.

3. The steel sheet of claim 1 wherein the weight ratio of chromium to the particulate material in the conversion coating is 1:1 to 2:1.

4. The steel sheet of claim 1 wherein the particulate material has a size of 0.001–0.2μ.

5. The steel sheet of claim 1 wherein the conversion coating has a thickness no greater than 0.02 mm.

6. The steel sheet of claim 1 wherein the paint contains a modified silicone resin and a black pigment.

7. The steel sheet of claim 1 wherein the paint has a thickness of at least 0.005 mm.

8. The steel sheet of claim 7 wherein the paint contains at least 30 wt. % silicone resin and has a thickness of 0.015–0.050 mm.

9. The steel sheet of claim 1 wherein the dry film has a thickness of at least 0.0005 mm.

10. The steel sheet of claim 1 wherein the dry film has a weight of at least 10 $mg/m^2$.

11. The steel sheet of claim 1 wherein the dry film has a coefficient of friction of no greater than about 0.05.

12. The steel sheet of claim 1 being from the group consisting of hot rolled and pickled steel, cold-rolled steel, cold-rolled chromium alloyed steel, cold-rolled stainless steel and metallic coated steel.

13. A precoated heat resistant steel sheet, comprising:

a chromium alloyed steel sheet, at least one surface of the sheet provided with a protective coating resistant to delamination at temperatures up to about 540° C. including an inner inorganic portion, an outer organic portion with the organic portion including a dry film, the inner inorganic portion including at least 50 $mg/m^2$ of a chromium based conversion coating, the conversion coating containing a particulate material with the weight ratio of chromium to the particulate material within the range of 1:1 to 2:1, the outer organic portion being a dried silicone paint containing 40–60 wt. % silicone resin and having a thickness of at least 0.015 mm, the dry film being a copolymer of thermoplastic acrylic resin and lubricant or polymeric olefin, the copolymer containing 5–70 wt. % of the lubricant and the polymeric olefin containing at least 90% olefin resin, dry film having a thickness of 0.002–0.020 mm and a weight of 100–5000 $mg/m^2$ whereby the dry film is tack-free, impervious to moisture, oil, dirt, and the like and the coated sheet capable of being welded and ready for forming into a heat resistant part with minimal delamination of the dried silicone paint without additional external lubricant being required on the sheet.

14. A process for the production of a heat resistant steel sheet, comprising the steps of:

providing a steel sheet, coating at least one surface of the sheet with a chromic acid based liquid coating containing particulate material, drying the sheet and forming a conversion coating on the one surface, coating the conversion coated surface with a liquid silicone paint containing at least 50 wt. % solids with the solids portion of the paint being at least 20 wt. % silicone resin, heating the painted sheet at a peak metal temperature for sufficient time to dry the silicone paint, coating the dry paint with a continuous aqueous suspension containing 10–60% solids of a polymeric lubricant, the polymeric lubricant being a copolymer of a thermoplastic acrylic and a lubricant or a polymeric olefin, the copolymer containing 5–70 wt. % of the lubricant and the polymeric olefin containing at least 90% olefin resin, and heating the lubricant coated sheet at a peak metal temperature for sufficient time to form a tack-free dry lubricant film impervious to moisture, oil, dirt, and the like with the coated sheet ready for forming into a heat resistant part with minimal delamination of the silicone paint without additional lubricant being applied to the one surface.

15. The process of claim 14 wherein the painted sheet heating temperature is less than 300° C.

16. The process of claim 15 wherein the painted sheet heating temperature is less than 250° C. for less than one minute.

17. The process of claim 14 wherein the lubricant coated sheet heating temperature is about 65–110° C.

18. The process of claim 14 wherein the dry paint contains at least 30 wt. % silicone resin and has a thickness of 0.005–0.050 mm.

19. The process of claim 14 wherein the dry film has a thickness of 0.0005–0.02 mm.

20. A process for the production of a heat resistant steel sheet, comprising the steps of:

providing a chromium alloyed steel sheet, coating at least one surface of the sheet with a chromic acid based liquid coating containing particulate silica with the weight ratio of chromium to the particulate silica within the range of 1:1 to 2:1, drying the sheet and forming at least 50 $mg/m^2$ of a conversion coating on the one surface, coating the conversion coated surface with a liquid silicone paint containing at least 50 wt. % solids with the solids portion of the paint being 40–60 wt. % silicone resin, heating the painted sheet at a temperature less than 250° C. for sufficient time to dry the silicone paint, coating the dry paint with a continuous aqueous suspension containing 10–60% solids of a polymeric lubricant, the polymeric lubricant being a copolymer of a thermoplastic acrylic and a lubricant or a polymeric olefin, the copolymer containing 5–70 wt. % of the lubricant and the polymeric olefin containing at least 90% olefin resin, and heating the lubricant coated sheet at a temperature of about 25°–120° C. for sufficient time to form a tack-free dry lubricant film impervious to moisture, oil, dirt, and the like with the coated sheet ready for forming into a heat resistant part with minimal delamination of the silicone paint without additional lubricant being applied to the one surface.

* * * * *